United States Patent
Kopp

[15] 3,638,680
[45] Feb. 1, 1972

[54] TABLE WITH LIQUID OUTLET

[72] Inventor: Hans W. Kopp, c/o Oederlin and Co., Ltd., Baden, Switzerland

[22] Filed: Feb. 25, 1970

[21] Appl. No.: 14,057

[52] U.S. Cl.....................137/606, 137/607, 4/192, 251/57, 251/131, 137/801
[51] Int. Cl........................................F16k 19/00
[58] Field of Search..............251/57, 131; 137/606, 607, 137/801; 4/192

[56] References Cited

UNITED STATES PATENTS

| 2,839,264 | 6/1958 | Trubert | 251/57 |
| 2,908,017 | 10/1959 | Whaley | 4/192 X |
| 3,250,295 | 5/1966 | Palmer et al. | 137/606 |
| 3,374,957 | 3/1968 | Tyler | 137/606 X |
| 3,415,278 | 12/1968 | Yamamoto et al. | 137/607 |

*Primary Examiner*—Robert G. Nilson
*Attorney*—Pennie, Edmonds, Morton, Taylor and Adams

[57] ABSTRACT

The present invention relates to a washing table with a liquid or water outlet apparatus having a supply line with an electrically operated valve, such as a solenoid valve, controlled by a relay having a control circuit. The circuit includes a pressure-sensitive switch means operated through a fluid-containing control tube line, a pressure-applying trigger means and a diaphragm to permit facile control of the valve.

15 Claims, 7 Drawing Figures

PATENTED FEB 1 1972

INVENTOR.
HANS W. KOPP

BY
Pennie, Edmonds, Morton, Taylor & Adams
ATTORNEYS

INVENTOR.
HANS W. KOPP

INVENTOR.
HANS W. KOPP

TABLE WITH LIQUID OUTLET

BACKGROUND OF THE INVENTION

Washing tables are usually provided with at least one hand-operable water shutoff element, such as a turn-type valve or a valve operated by a pivoted lever. In public washing facilities which are in frequent use, the water shutoff element is therefore exposed to heavy soiling, which may also involve the transfer of harmful bacteria. A known remedy is to install a water shutoff element which is operable with a part of the body other than the hand, such as the foot, knee or elbow; however, operation of such a water shutoff element has been found to be awkward. In the known systems, operation of the water shutoff element, and particularly in the case of physically handicapped persons, involves difficult or even impossible body movements besides a corresponding physical effort.

The object of the present invention is to avoid the aforesaid drawbacks by providing a system permitting the water flow to be controlled by a single, simple and light touch of the finger or other portion of the body. The washing table disclosed herein is characterized in that the pressure-sensitive switch operated by the trigger means is a pressure wave switch and is further characterized in that a stepping switch and a time relay may be fitted into the energizing circuit of the solenoid valve.

SUMMARY OF THE INVENTION

Broadly, the present invention is a liquid outlet apparatus comprising at least one supply line, an outlet line, a valve between the two lines for stopping and controlling the rate of flow, electrically operated means for opening and closing the valve, a control circuit for actuating the electrically operated means including a fluid-containing control conduit adapted to having pressure applied at one end to move a diaphragm at the other end to operate the control circuit. The control conduit permits the application of slight pressure to its end to operate the valve to obtain the desired flow of liquid.

It is a feature of this invention that it may be used for washstands to readily turn on and off and to vary the hot and cold water supplies.

DESCRIPTION OF THE PREFERRED EMBODIMENT OF THE INVENTION

Figure 1:
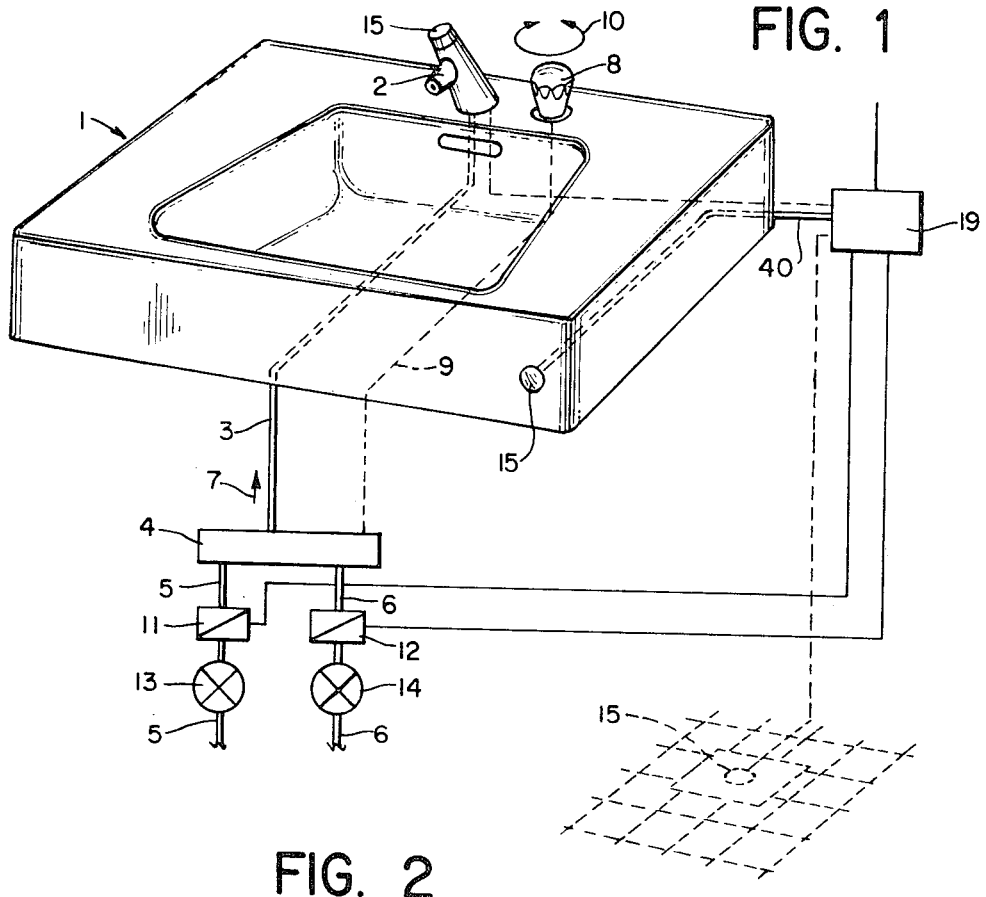
FIG. 1 shows an arrangement with washing table and water outlet.

A washing table 1 is provided with a water outlet 2 which is connected through a water supply line 3 to a mixer 4. Leading into the mixer 4 are a hot waterline 5 and a cold waterline 6. For the purpose of setting the temperature of the mixed water flowing through the line as indicated by the arrow 7, the washing table 1 is provided with a knob 8 which adjusts the mixer 4 by means of a mechanical linkage 9, such as a spindle. The setting of the mixed water temperature can be effected purely mechanically as by turning the knob 8 in the directions of the arrow 10 to vary the proportions of the hot and cold water flowing into the mixer 4. Alternatively, the mixer 4 may be controlled thermostatically with the knob 8 serving to select the water temperature to be maintained by the mixer. The mixer 4 and the knob 8 together with the mechanical link 9 are normally housed in a unit fitted below the washing table.

Figure 2:
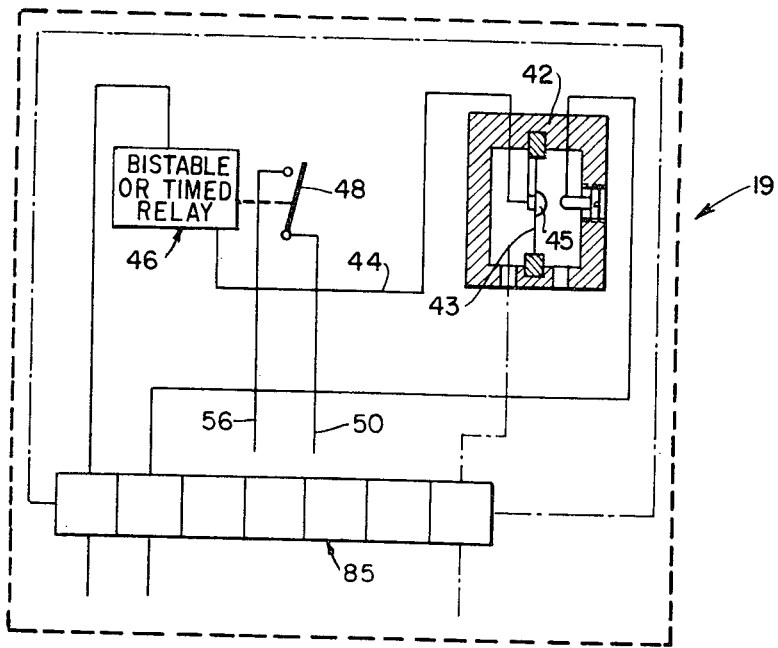
FIG. 2 shows the circuit of a control box for the cold water section.

The hot and cold waterlines 5 and 6 are each fitted with a solenoid valve 11 and 12 respectively. When energized, the solenoid valves 11 and 12 are open. On the input side of the said solenoid valves, the hot and cold waterlines 5 and 6 are each fitted with a valve 13 and 14 respectively, which are designed as shutoff and flow control valves permitting the water supply to be shut down for overhaul work or permitting hot and cold water to be supplied to the mixer 4 in at least approximately equal quantities. Positioned in the washing table 1, such as on its front surface, is a trigger means 15 arranged in a socket. This trigger means 15, which may be fitted into the water outlet 2 or in the floor, as shown by the broken lines in FIG. 1, communicates through a small tube 40 with a pressure wave switch 42 (FIG. 2). Air is the fluid in tube 40.

The pressure wave switch 42 comprises a diaphragm 43 with a contact point 45 is part of an electric circuit 44 in which a stepping relay 46 or a time relay is arranged. When energized, the stepping relay 46 closes a switch 48 arranged in an electric circuit 50 connected to solenoid valve 11. The pressure wave switch 42 and the stepping relay 46 are arranged in the control unit 19. As shown in FIG. 2, the conduit or tube 40 and the electric wires leading to and from the control unit 19 are secured thereto by means of a connector 85 which may be of any suitable type. A similar group of elements comprising a second pressure wave switch and a stepping relay accommodated in the control unit 19 is operatively connected to the second solenoid valve 12.

In the inoperative state, the circuits 50 and 56 of the solenoid valves 11 and 12 and the impulse lines 44 of the stepping relays 46 are open. The diaphragm 43 of the pressure wave switches 42 are also in their inoperative state and hot and cold waterlines 5 and 6 are shut off.

When only cold water is required, a gentle touch of the trigger means 15 for cold water is sufficient to give a pressure impulse through the tube 40 to the pressure wave switch 42 for cold water and displace the diaphragm 43. As a result, the contact point 45 closes the circuit 44, the stepping relay 46 trips, closing the switch 48 and, with it, the circuit 50 which is connected to the solenoid valve 12. Valve 12 opens and cold water flows through the mixer 4 and from the outlet 2. Water is shut off by touching the trigger means 15 to actuate pressure wave switch 42 to trip the stepping relay 46. This opens the switch 48, and the solenoid valve 12 closes. By a second trigger means similar action can be obtained for the hot water solenoid valve 11. Touching both trigger means causes both solenoid valves 11 and 12 to switch simultaneously, so that warm water, mixed from hot and cold water according to the setting of the valves 13 and 14 and the knob 8, flows from the outlet 2. The water is shut off in the same manner.

Figure 3:
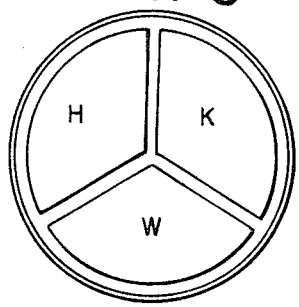
FIG. 3 shows a diagram of a combination trigger means viewed from one end.

If time relays are used instead of stepping relays 46, the solenoid valves 11 and 12 can be caused to close after remaining open for a time set on the time relay, circuits 50 and 56 of the valves 11 and 12 opening after the particular time has run out. This time may, for instance, be set shorter for the flow of hot water than for that of cold water. It is also possible to arranged three trigger means in three different segments in a single socket as shown in diagram in FIG. 3. Touching zone K causes cold water to flow, zone H hot water and zone W warm water. The trigger means associated with W switches the circuits for K and H simultaneously. Fine adjustment of the mixing temperature is effected by the knob 8.

By the system described it is possible with the slightest movement of the body and with negligible effort to open and close the water supply to the washing table with only very slight, or without any, soiling of controls, and in particular to stop the water supply without again having to tough wet or soiled faucets. The system described thus ensures a substantially more hygienic and simpler control of the water supply than do the known water shutoff valves.

In a simpler embodiment, the washing table 1 may merely have a cold water supply in which the hot waterline 5, the control valve 13, the solenoid valve 11, the mixer 4 would not be required. Similarly, if only hot water is supplied the cold waterline, valve and mixer would not be required. The mixed water temperature may have a fixed setting in the mixer 4, thus dispensing with the knob 8. The hot and cold waterlines 5 and 6 may be joined to form the mixed waterline 3 by means of a simple connecting piece, without requiring a special adjustable and/or thermostatically controlled mixer 4. In this simplified version, the mixed-water temperature and the mixed water quantity flowing from the outlet 2 are given a fixed setting by means of the control valves 13 and 14. On the other hand, a single solenoid valve may be fitted into a mixed waterline provided or, in the embodiment shown in the drawing, in the line 3. Of course, the trigger means 15 may be positioned relative to the washing table 1 in an arrangement other than the one shown.

Figure 4:
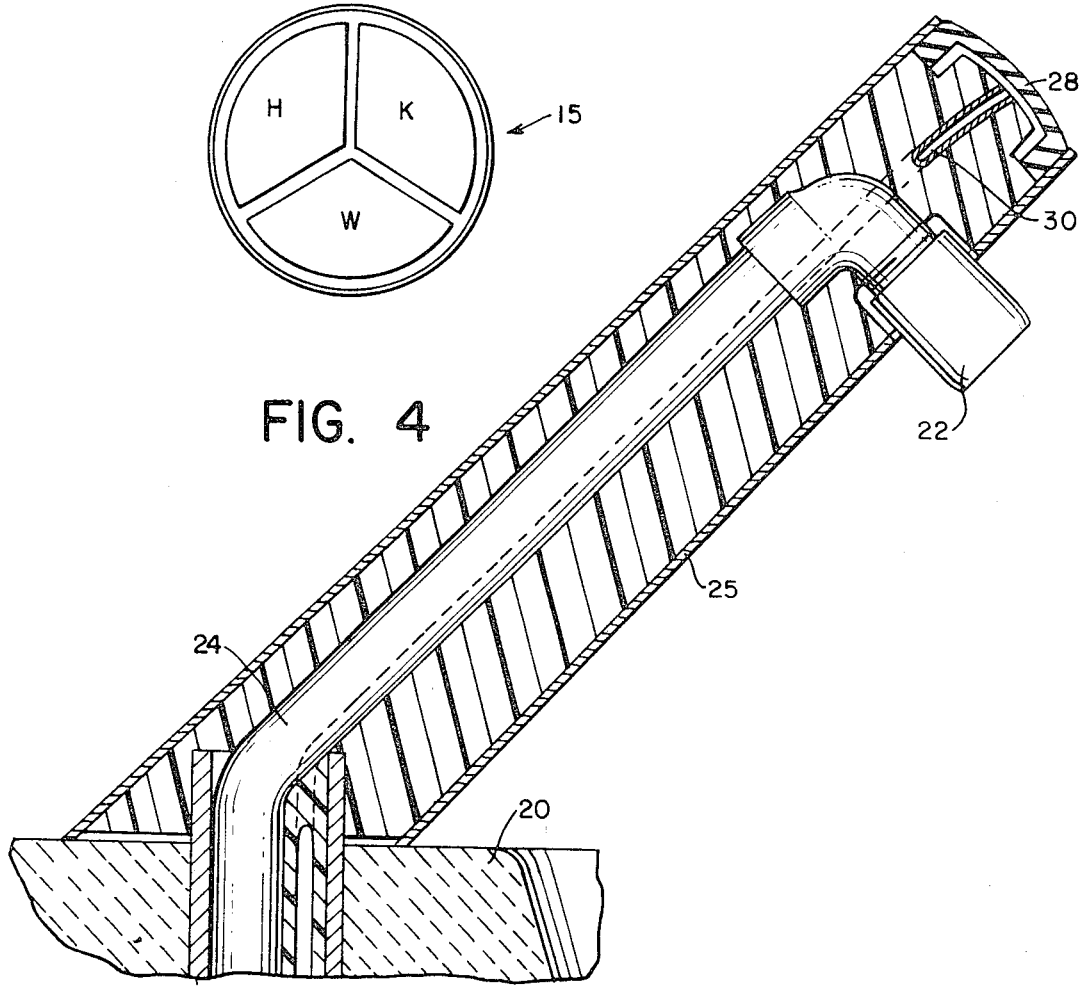
FIG. 4 shows a sectional elevational view of the top portion of a single outlet without temperature control.

FIG. 4 shows a portion 20 of a washing table with a water inlet 24 and an outlet 22. A jacket 25 envelops the water inlet 24 and part of the outlet 22 in the manner shown. The free end of the jacket serves to accommodate a trigger means 28 from which control line 30 leads to the pressure wave switch (not shown). This embodiment has the advantage that the washing table can be of the standard type and need not be specially designed for the accommodation of two trigger means 28.

Figure 5:
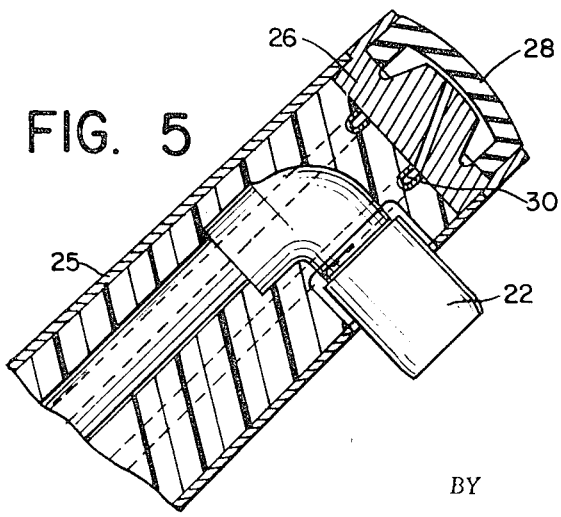
FIG. 5 shows a sectional view of a single outlet with temperature control device at the outlet.

FIG. 5 shows an embodiment similar to that in FIG. 4 having in addition a rotatable ring 26 for setting the water temperature. Ring 26 can be turned into any of three preset positions, viz for cold, warm and hot water. In the COLD position, only the solenoid valve for cold water opens; in the HOT position, only that for hot water opens; in the WARM midposition, both solenoid valves open according to their setting determining the mixed water temperature. The particular impulse from the trigger means 26 to the pressure wave switches (not shown) is set by means of the ring 26. The water-bearing lines and/or the control lines can be heated in a jacket tube and cast with synthetic resin.

Figure 6:
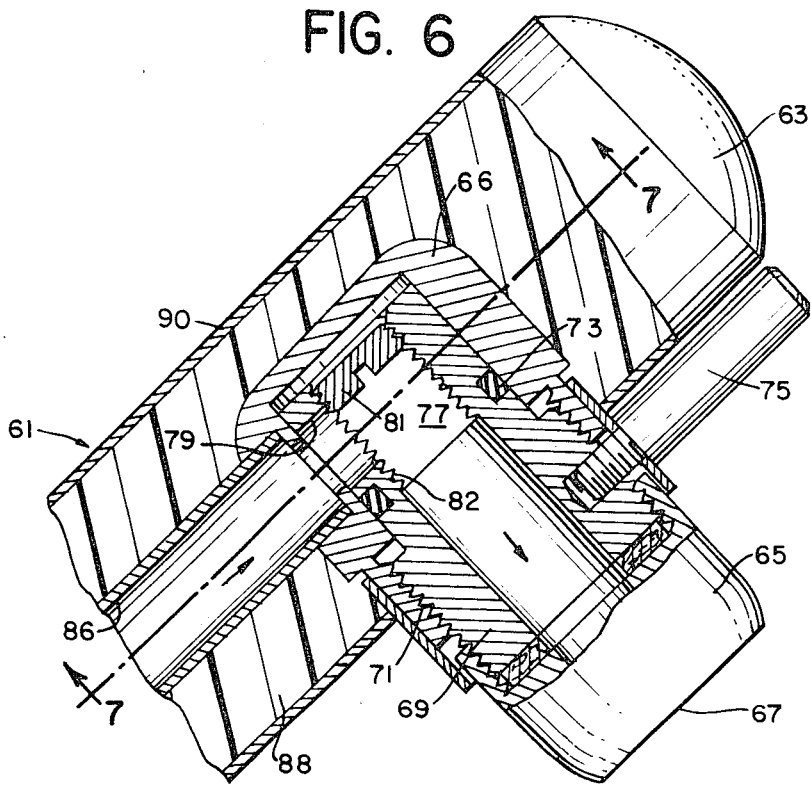
FIG. 6 shows the upper free end of a nozzle assembly, partly in section, taken along line 6—6 in FIG. 7.
Figure 7:
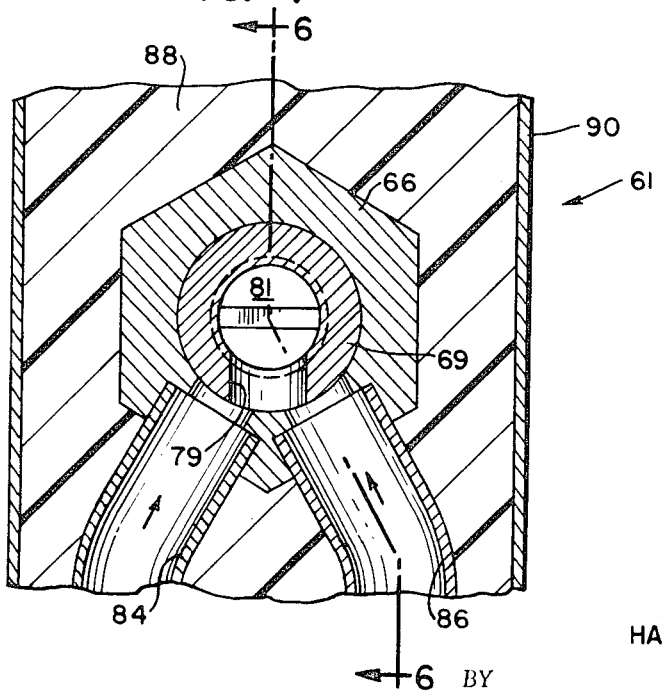
FIG. 7 shows a sectional view through the outlet nozzle and a mixing device taken along line 7—7 in FIG. 6.

In FIGS. 6 and 7 there is shown a nozzle assembly 61 for use with the invention whose free end is provided with a trigger means 63 for actuating the solenoid valves (not shown) in the cold and hot water system. Arranged in the nozzle assembly 61 and adjacent to the trigger means 63 is an outlet nozzle 65, whose case 66 serves to accommodate a nozzle body with a nozzle mouth 67. On the input side of the said nozzle body, a mixing device 69 is let into the nozzle case 66 by means of a thread 71. The rear part, shown higher up in FIG. 6, of the mixing device 69 carries on O-ring seal 73. The mixing device 69 can be actuated from outside by a lever 75 movable between two stops (not shown). A central bore in the mixing device 69 serves as mixing chamber 77. This is provided at the top with a lateral supply aperture 79, whose cross section can be adjusted by an adjusting disk 81. When turned, the adjusting disk 81 moves in threads 82 in the axial direction of the mixing chamber 77. A cold waterline 84 and a hot waterline 86 lead into the nozzle case 66. The front part of the nozzle case 66 is grouped with the cold waterline 84 and the hot waterline 86 in the jacket 90 filled out with cast synthetic resin 88 to form a unit well insulate to prevent heat transfer towards the outside.

Touching the trigger means 63 operates the valves for cold and hot water to cause the water streams to flow through the lines 84 and 86 and the aperture 79 into the mixing chamber 77 where they mix and then flow out through the nozzle mouth 67 of the outlet nozzle 65 in the mixing proportions required, i.e., at the temperature required. By moving the lever 75, the lateral inlet aperture 79 in the mixing device 69 can be altered relatively to the inlet cross sections of the lines 84 and 86 so that the mixture flowing from the nozzle mouth 67 becomes warmer or colder. In one of the extreme positions of the lever 75, the lateral inlet aperture 79 is exactly opposite the inlet of the hot waterline 86; in the other extreme position, opposite the inlet of the cold waterline 84. In the intermediate positions of the mixing device 69 movable by the lever 75, cold and hot water are admitted to the mixing chamber 77 in the requisite proportions as determined by the position of the mixing device. It is further possible after removing the outlet nozzle 65, to alter the maximum outflow of water by turning the adjusting disk 81 by means of a screwdriver. This setting does not require an expert to make it.

The advantage of the system described consists in providing a washing table with a valve assembly of extremely compact construction, with easily cleaned surfaces and very simple adjusting facility for the mixing proportions or the temperature of the outflowing water and the quantity thereof.

I claim:

1. A liquid outlet apparatus comprising a supply line, an outlet line communicating with said supply line, a valve between said supply and outlet lines including electrical switch means for opening and closing said valve, means for controlling said electrical switch means including a pressure wave switch communicating through a fluid conduit with a pressure trigger means, and a relay means actuated by said pressure wave switch for controlling said electrical switch means, said relay means remaining in said actuated state after said pressure wave has subsided.

2. The apparatus of claim 1 having a plurality of supply lines, a valve between each supply line and said outlet line, switch means for independently operating each valve, and means for independently controlling each of said electrical switch means, each control means including a pressure switch communicating through a fluid conduit with a pressure trigger means, and an electrical relay means activated by said pressure wave switch for controlling said electrical switch means.

3. The apparatus according to claim 2, wherein said pressure wave switches comprise an electrical contact means, and a diaphragm positioned adjacent said contact means, said associated fluid conduit having one end communicating with said diaphragm.

4. The apparatus of claim 3 wherein said relay means is a bistable relay.

5. The apparatus according to claim 4 further comprising a nozzle assembly which includes pressure trigger means for applying pressure to move said diaphragm and mixer means for mixing a plurality of fluids.

6. The apparatus of claim 4 in which each of a plurality of supply lines discharges into a mixer means and in which the outlet line communicates with said mixer means.

7. The apparatus of claim 6 in which the mixer means is located at the discharge end of said outlet line, said mixer means having control means for controlling the operation of said mixer means.

8. The apparatus of claim 4 in which at least a portion of said fluid conduit for transmitting pressure to the diaphragm is arranged with said outlet line in a common jacket tube.

9. The apparatus according to claim 4 having in addition said fluid conduit and said outlet line cast in synthetic resin in a housing.

10. The apparatus of claim 3 wherein said relay means comprises a timed relay.

11. The apparatus according to claim 10 further comprising a nozzle assembly which includes pressure trigger means for applying pressure to move said diaphragm and mixer means for mixing a plurality of fluids.

12. The apparatus of claim 10 in which each of a plurality of supply lines discharges into a mixer means and in which the outlet line communicates with said mixer means.

13. The apparatus of claim 12 in which the mixer means is located at the discharge end of said outlet line, said mixer means having control means for controlling the operation of said mixer means.

14. The apparatus of claim 10 in which at least a portion of said fluid conduit for transmitting pressure to the diaphragm is arranged with said outlet line in a common jacket tube.

15. The apparatus according to claim 10 having in addition said fluid conduit and said outlet line cast in synthetic resin in a housing.

* * * * *